United States Patent
Kang

(10) Patent No.: US 10,816,940 B2
(45) Date of Patent: Oct. 27, 2020

(54) SENSOR CONTROLLER AND SENSOR ASSEMBLY FOR COLLECTING A VARIETY OF MACHINE RELATED OPERATIONS DATA

(71) Applicant: Ulala Lab. Inc., Anyang-si, Gyeonggi-do (KR)

(72) Inventor: Hak Ju Kang, Anyang-si (KR)

(73) Assignee: ULALA LAB INC., Anyang-si, Gyeonggi-Do (KR)

( * ) Notice: Subject to any disclaimer, the term of this patent is extended or adjusted under 35 U.S.C. 154(b) by 119 days.

(21) Appl. No.: 15/703,665

(22) Filed: Sep. 13, 2017

(65) Prior Publication Data

US 2018/0107171 A1 Apr. 19, 2018

(30) Foreign Application Priority Data

Oct. 17, 2016 (KR) .................. 10-2016-0134153

(51) Int. Cl.
*G05B 23/02* (2006.01)
*G05B 11/01* (2006.01)
*G05B 19/418* (2006.01)

(52) U.S. Cl.
CPC .......... *G05B 11/01* (2013.01); *G05B 19/4183* (2013.01); *G05B 23/02* (2013.01);
(Continued)

(58) Field of Classification Search
CPC .... G05B 23/02; G05B 23/00; G05B 23/0205; G05B 23/0208; G05B 23/0213; G05B 23/0216; G05B 23/0221; G05B 19/4183; G05B 19/0425; G05B 19/418; G05B 19/41855; G06Q 10/0639; Y02P 90/02; Y04S 10/54
See application file for complete search history.

(56) References Cited

U.S. PATENT DOCUMENTS

2008/0270162 A1* 10/2008 Machacek .......... G05B 23/0221
702/182
2014/0350993 A1* 11/2014 Kawada .......... G06Q 10/06315
705/7.25
(Continued)

FOREIGN PATENT DOCUMENTS

CN 1905484 A 1/2007
CN 101344783 A 1/2009
(Continued)

OTHER PUBLICATIONS

The Data Conversion Handbook, Edited by Walt Kester, Newnes, 2004 (Year: 2004).*

*Primary Examiner* — Benyam Haile
(74) *Attorney, Agent, or Firm* — Dinsmore & Shohl LLP; Yongsok Choi, Esq.

(57) ABSTRACT

According to the present disclosure, a sensor controller configured to collect a variety of machine related operations data may receive operation data from at least one measurement sensor connected to a machine and configured to detect the operation data of the machine and transfer the operation data to a communication module to be transmitted to and collected by a server. Even if a different measurement sensor is connected to a sensor controller, the operation data of the connected measurement sensor can be still recognized.

8 Claims, 5 Drawing Sheets

(52) U.S. Cl.
  CPC ..... *G05B 23/0205* (2013.01); *G05B 23/0221* (2013.01); *G05B 2219/32181* (2013.01); *Y02P 90/10* (2015.11); *Y02P 90/18* (2015.11); *Y02P 90/22* (2015.11)

(56) References Cited

U.S. PATENT DOCUMENTS

2016/0132766 A1* 5/2016 Adams ................... G06N 3/063
                                                    706/33
2017/0220404 A1* 8/2017 Polar Seminario ..........................
                                                    G06F 11/0736

FOREIGN PATENT DOCUMENTS

| CN | 104184610 A | 12/2014 |
| CN | 104750068 A | 7/2015 |
| JP | 2014-229176 A | 12/2014 |
| KR | 1020110098986 A | 9/2011 |
| KR | 20130061029 A | 6/2013 |
| KR | 20150069468 A | 6/2015 |
| KR | 20150106219 A | 9/2015 |
| KR | 101572960 B1 | 12/2015 |

\* cited by examiner

SENSOR CONTROLLER AND SENSOR ASSEMBLY FOR COLLECTING A VARIETY OF MACHINE RELATED OPERATIONS DATA

CROSS-REFERENCE TO RELATED APPLICATION

This application claims the benefit under 35 USC 119(a) of Korean Patent Application No. 10-2016-0134153 filed on Oct. 17, 2016, in the Korean Intellectual Property Office, the entire disclosures of which are incorporated herein by reference for all purposes.

TECHNICAL FIELD

The present disclosure relates to a sensor controller and a sensor assembly for collecting a variety of operation data of a machine based operation data.

BACKGROUND

Currently, a factory automation system is being used by many companies, and the use thereof is being encouraged by the governments around the world. However, there are many restrictions for small and medium-sized businesses to actually implement desired factory automation systems. That is, in order to use the factory automation, it is necessary to invest a considerable amount of money, and in addition to infrastructure costs, if a measurement sensor of the automation system is specifically designed for a component of a product produced by a certain company, and in the case where products of another company are to be implemented—the whole measurement value system must be changed. In addition, there is also a case in which it is necessary to change the setting of the measurement module which takes considerable time and money. Therefore, in many cases, it is more efficient to frequently make measurement and perform monitoring with the existing staff than to use the automation system.

Sensors of existing factory automation system perform their own specific functions. For example, a temperature sensor able to transmit the data measured through a modularized device, which is a combination of a module and a temperature measurement sensor, to a server or a data server that manages the data, consequently manager checks information about the data. These combined devices are also managed and controlled through complex connections to the system. However, if other than temperature sensor additional humidity sensor is required, it would be too costly to further manufacture a device that combines humidity and the temperature sensors together, as well as a lot of time and manpower to newly design and develop the device.

SUMMARY

As means for achieving the above technical objectives, the present invention collects and integrates machine related operation data within a factory from various sensors, and transmits the data to the server, as a result proving real-time information about factory operations.

In the present disclosure, a sensor controller configured to collect a variety of machine based operation data receives operation data from at least one measurement sensor connected to a machine and configured to detect the operation data of the machine and transfers the operation data to a communication module to be transmitted to and collected by a server, and even if the sensor controller is connected to a measurement sensor different in kind from the at least one measurement sensor via replacement or addition of a measurement sensor, the sensor controller recognizes operation data of the measurement sensor connected to the sensor controller.

Further, in the present disclosure, a sensor assembly configured to collect a variety of machine based operation data may include: a sensor controller configured to receive operation data from at least one measurement sensor connected to a machine and configured to detect the operation data of the machine; and a communication module configured to receive the operation data transferred from the sensor controller and transmit the operation data to a server, and even if the sensor controller is connected to a measurement sensor different in kind from the at least one measurement sensor via replacement or addition of a measurement sensor, the sensor controller recognizes operation data of the measurement sensor connected to the sensor controller, and the sensor controller and the communication module are physically separate from each other.

According to yet another exemplary embodiment of the present disclosure, a non-transitory computer-readable storage medium stored in a sensor configured to collect a variety of machine based operation data including a program configured to receive operation data from at least one measurement sensor connected to a machine and configured to detect the operation data of the machine and transfer the operation data to a communication module to be transmitted to and collected by a server, and even if the program is connected to a measurement sensor different in kind from the at least one measurement sensor via replacement or addition of a measurement sensor, the program enables recognition of operation data of the measurement sensor connected to the program.

According to the present disclosure, when operation data of a machine within a factory are collected, even data obtaining sensors incompatible with each other obtain an integrated set of information through a sensor controller and supply the integrated set of information to a server. Thus, it is possible to achieve convenience in obtaining information about the machine within a factory.

Further, the sensor controller, a communication module, and measurement sensors are implemented as modular assembly type, which makes it easy to add or replace a measurement sensor. Thus, a factory manager's convenience in managing sensors can be improved.

Furthermore, even if sensors are incompatible with each other, firmware is automatically installed and upgraded in real time in the sensor controller. Thus, it is possible to overcome the conventional technological barriers in using various measurement sensors.

BRIEF DESCRIPTION OF THE DRAWINGS

In the detailed description that follows, embodiments are described as illustrations only since various changes and modifications will become apparent to those skilled in the field from the following detailed description. The use of the same reference numbers in different figures indicates similar or identical items.

DETAILED DESCRIPTION

Figure 1:
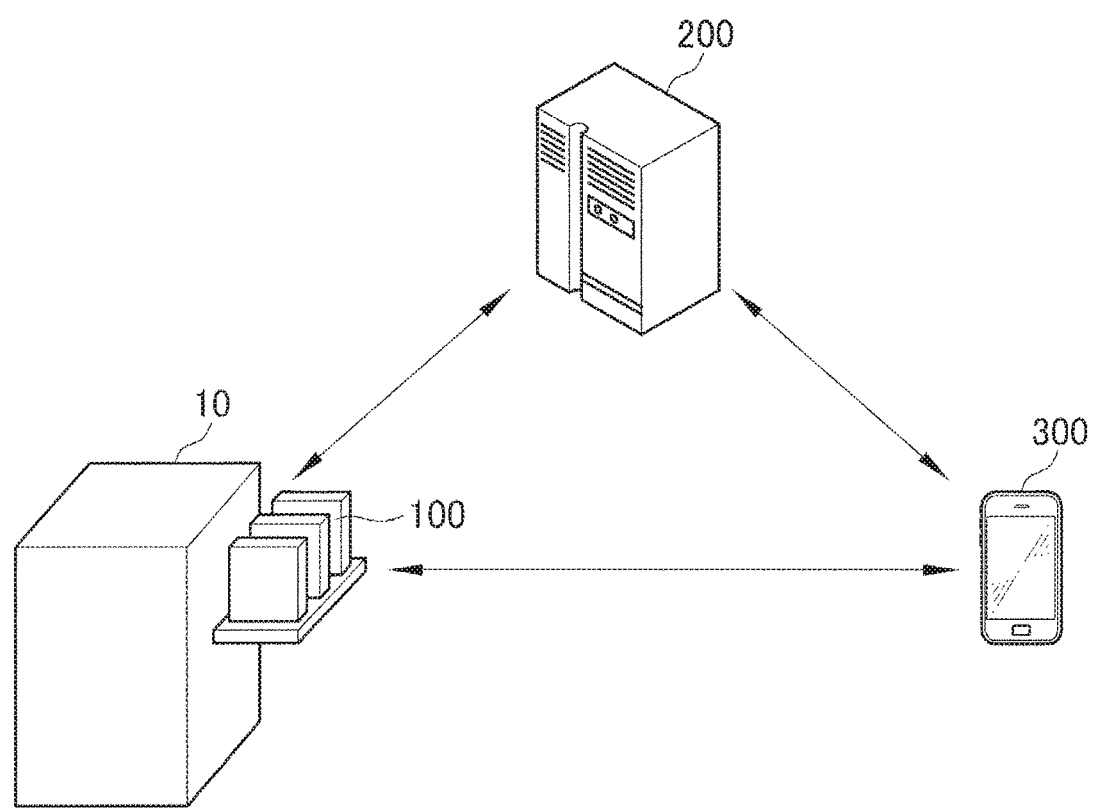
FIG. 1 is a configuration view of a system in accordance with an exemplary embodiment of the present disclosure.

Hereinafter, embodiments of the present disclosure will be described in detail with reference to the accompanying drawings so that the present disclosure may be easily implemented by those skilled in the field. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit," "controller," or "module" includes a unit implemented by hardware, a unit implemented by software, and a unit implemented by both of them. One unit may be implemented by two or more pieces of hardware, and two or more units may be implemented by one piece of hardware. However, "the unit" is not limited to the software or the hardware and may be stored in an addressable storage medium or may be configured to implement one or more processors. Accordingly, "the unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by "the units" can be combined with each other or can be divided. Further, the components and "the units" may be configured to implement one or more CPUs in a device or a secure multimedia card.

A "user device" to be described below may be implemented with computers or portable devices which can access a server or another device through a network. Herein, the computers may include, for example, a notebook, a desktop, and a laptop equipped with a WEB browser. For example, the portable devices are wireless communication devices that ensure portability and mobility and may include all kinds of handheld-based wireless communication devices such as IMT (International Mobile Telecommunication)-2000, CDMA (Code Division Multiple Access)-2000, W-CDMA (W-Code Division Multiple Access), Wibro (Wireless Broadband Internet), LTE (Long Term Evolution) communication-based device, smart phone, tablet PC, and the like. Further, the "network" may be implemented as wired networks such as a Local Area Network (LAN), a Wide Area Network (WAN) or a Value Added Network (VAN) or all kinds of wireless networks such as a mobile radio communication network or a satellite communication network.

Hereinafter, a system according to an exemplary embodiment of the present disclosure will be described in detail.

Referring to FIG. 1, the system according to an exemplary embodiment of the present disclosure includes a sensor assembly 100, a server 200, and a user device 300 provided near a machine 10 within a factory.

The system according to an exemplary embodiment of the present disclosure may provide a smart factory service. The smart factory service can provide the efficiency and convenience in managing the machine 10 to the manager by monitoring an operational status of the machine 10 in the factory in real time and if a malfunction is highly likely to occur or occurs, immediately reporting the malfunction to the manager. Particularly, an IoT (Internet of Things)-based service is provided through the sensor assembly 100, and, thus, it is possible to eliminate the factory manager's inconvenience of checking each machine 10 in detail.

The sensor assembly 100 is an IoT integrated module device including at least one sensor. The sensor assembly 100 is provided near the machine 10 in the factory and may be attached to any one of surfaces of the machine 10. The sensor assembly 100 includes a sensor configured to measure operation data (data directly or indirectly indicative of an operational status of a machine such as temperature, humidity, pressure, electric power, etc.) of the machine 10 and a sensor configured to transmit the operation data to the server 200.

The server 200 may receive machine based operation data from the sensor assembly 100 provided in each machine 10. Further, the server 200 may manage operation data of each machine 10. Furthermore, the server 200 may predict the possibility of malfunction based on operation data collected via big data analysis or machine learning-based analysis.

The user device 300 may be equipped with an application configured to provide the smart factory service. The application may receive information from the server 200, process the information into a format easy for the user to understand, and supply the information about the operational status of the machine 10 to the user.

Figure 2:
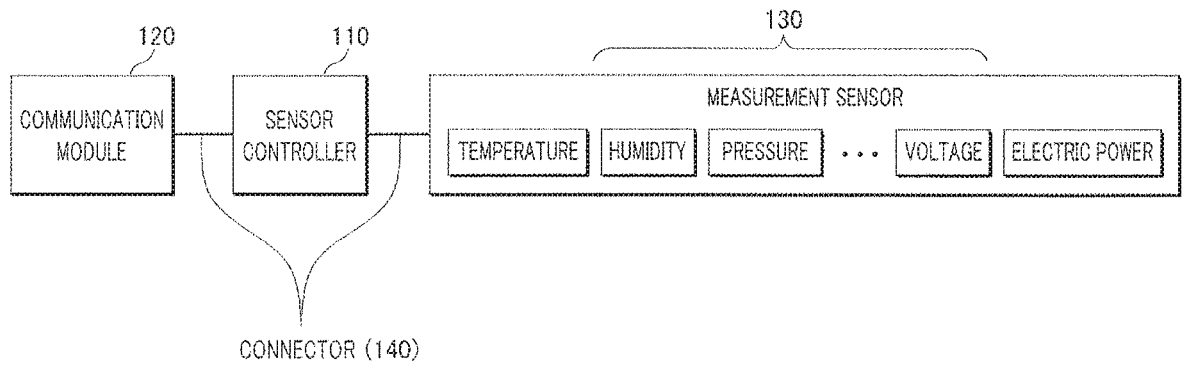
FIG. 2 is a block diagram for a structure of a sensor assembly in accordance with an exemplary embodiment of the present disclosure.

Hereinafter, a configuration of the sensory assembly 100 in accordance with an exemplary embodiment of the present disclosure will be described in detail with reference to FIG. 2.

The sensor assembly 100 includes multiple sensors. Specifically, the sensor assembly 100 may include a sensor controller 110, a communication module 120, a measurement sensor 130, and connectors 140.

The sensor controller 110 to measurement sensor 130 may be implemented as components physically separate from each other. That is, as illustrated in FIG. 1, each of the sensors may be formed into a hexahedral shape with physically similar or identical dimensions and can be very easily replaced for each module if necessary. For example, if any one of the sensor controller 110, the communication module 120, and the measurement sensor 130 breaks down or needs to be changed in usage, the problem can be easily solved by replacing that sensor.

Further, the sensor assembly 100 may further include a stand. The stand functions to support the sensor controller 110 together with the communication module 120. The stand has the area enough to cover the area of the sensor controller 110 and the communication module 120 and includes partition walls on its edges and thus may also function to fix the sensor controller 110 and the communication module 120 so as not to deviate to the outside. In this case, the sensor controller 110 and the communication module 120 may be arranged as being stacked on the stand.

Hereinafter, a function of each sensor will be described in detail.

The sensor controller 110 is configured to receive operation data from the measurement sensor 130 and transfer the operation data to the communication module 120 so as to be transmitted to and collected by the server 200. Herein, the sensor controller 110 is connected to at least one measurement sensor 130. Even if the existing measurement sensor 130 connected to the sensor controller 110 is replaced by a different kind of measurement sensor 130 via replacement or addition of the measurement sensor 130, the sensor controller 110 may receive operation data from the measurement sensor 130 currently connected thereto and recognize the operation data.

The sensor controller 110 may be connected to various sensors such as a temperature sensor, a pressure sensor, a humidity sensor, a current/voltage sensor, an electric power sensor, and the like.

Further, in the case where the server 200 is equipped with firmware, the sensor controller 110 simply functions to transfer an electric signal value (i.e., a value of an electric signal itself such as a current value (mA, A), a voltage value (mV, V), and a resistance value (mΩ, Ω)) from the measurement sensor 130 to the server 200.

In the case where firmware for ail of the sensors is downloaded and installed in the sensor controller 110, even if the sensors are not compatible with each other, the sensor controller 110 can recognize operation data of a signal of the corresponding sensor from the electric signal value based on the firmware.

The sensor controller 110 is configured to convert operation data received from the measurement sensor 130 into a normalized digital signal and then transfer the normalized digital signal to the communication module 120. For example, signals transferred from the temperature sensor and the pressure sensor to the sensor controller 110 may be electric signals of different formats. If these signals are transferred to the server 200 as they are, the server 200 may not accurately recognize information therein. Therefore, the sensor controller 110 may also function to covert an analog signal or digital signal into a normalized digital signal to be recognized by the server 200.

The communication module 120 may function to transfer information between the sensor controller 110 and the server 200 or the user device 300. That is, the communication module 120 may transmit operation data measured by the sensor controller 110 to the server 200, and may receive information of a command from the server 200 to the sensor controller 110 and transfer the information to the sensor controller 110.

The communication module 120 may be desirably a wireless communication module 120, but is not necessarily limited thereto, and may be a wire communication module 120. Further, the communication module 120 may be implemented to carry out various communications such as 3G, 4G, WIFI, Bluetooth, Zigbee, and the like.

The measurement sensor 130 is configured to measure machine based operation data. Specifically, the measurement sensor 130 may measure an electric signal value for an operation of the machine 10. Desirably, the measurement sensor 130 may be configured as a sensor for measuring operation data of the machine 10, but is not necessarily limited thereto, and may be configured as a sensor for also measuring information about the status of the factory or the current conditions of operation. For example, the measurement sensor 130 may be a sensor configured to measure any one of the temperature, pressure, humidity, voltage, electric power, and vibration. This is just an example, and the measurement sensor 130 may include a sensor configured to measure various other operation data.

The sensor controller 110, the communication module 120, and the measurement sensor 130 may be connected and fixed to each other through the connectors 140. The connectors 140 may be implemented as electric wires or lines. Otherwise, the connectors 140 may be implemented as multiple pins formed in a region of each of the sensors, respectively. If the connectors 140 are implemented as pins, the connectors 140 formed in the respective sensors are arranged and connected to be engaged with each other, and, thus, the sensors can be connected to each other. Further, if the connectors 140 are provided as being fixed and connected to each other, it is possible to connect the connectors 140 to each other and also possible to fix the relative positions of the sensors.

Figure 3:
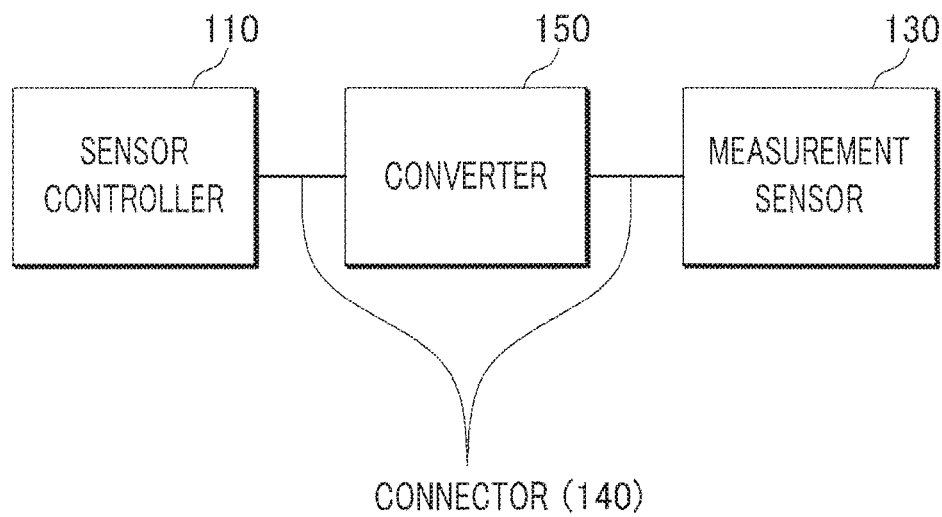
FIG. 3 is a block diagram for a structure of a sensor assembly in accordance with another exemplary embodiment of the present disclosure.
Figure 4:
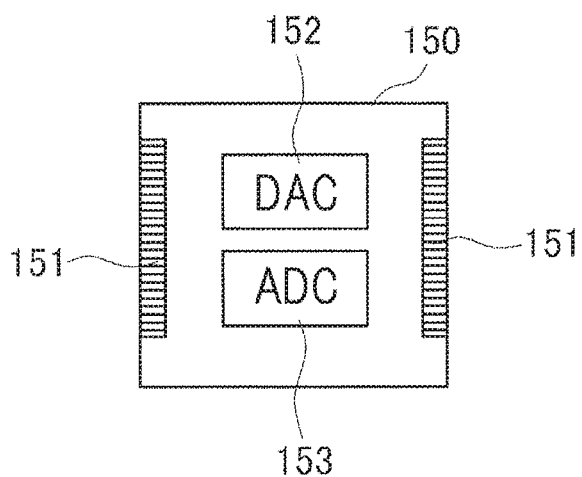
FIG. 4 is a configuration view for a converter in accordance with an exemplary embodiment of the present disclosure.

Meanwhile, referring to FIG. 3 and FIG. 4, the sensor assembly 100 may further include a converter 150.

The converter 150 may convert a signal transferred between at least one measurement sensor 130 and the sensor controller 110 from digital to analog or from analog to digital. The converter 150 may include a digital/analog conversion unit (DAC) 152 and an analog/digital conversion unit (ADC) 153. Further, the converter 150 may be connected to the measurement sensor 130 and the sensor controller 110 through a connecting wire or line, or may be configured as multiple pins 151 as illustrated in FIG. 4. In this case, the factory manager can easily connect the sensors just by inserting the converter 150 into the corresponding area as compared with the case of using the wire or line.

Figure 5:
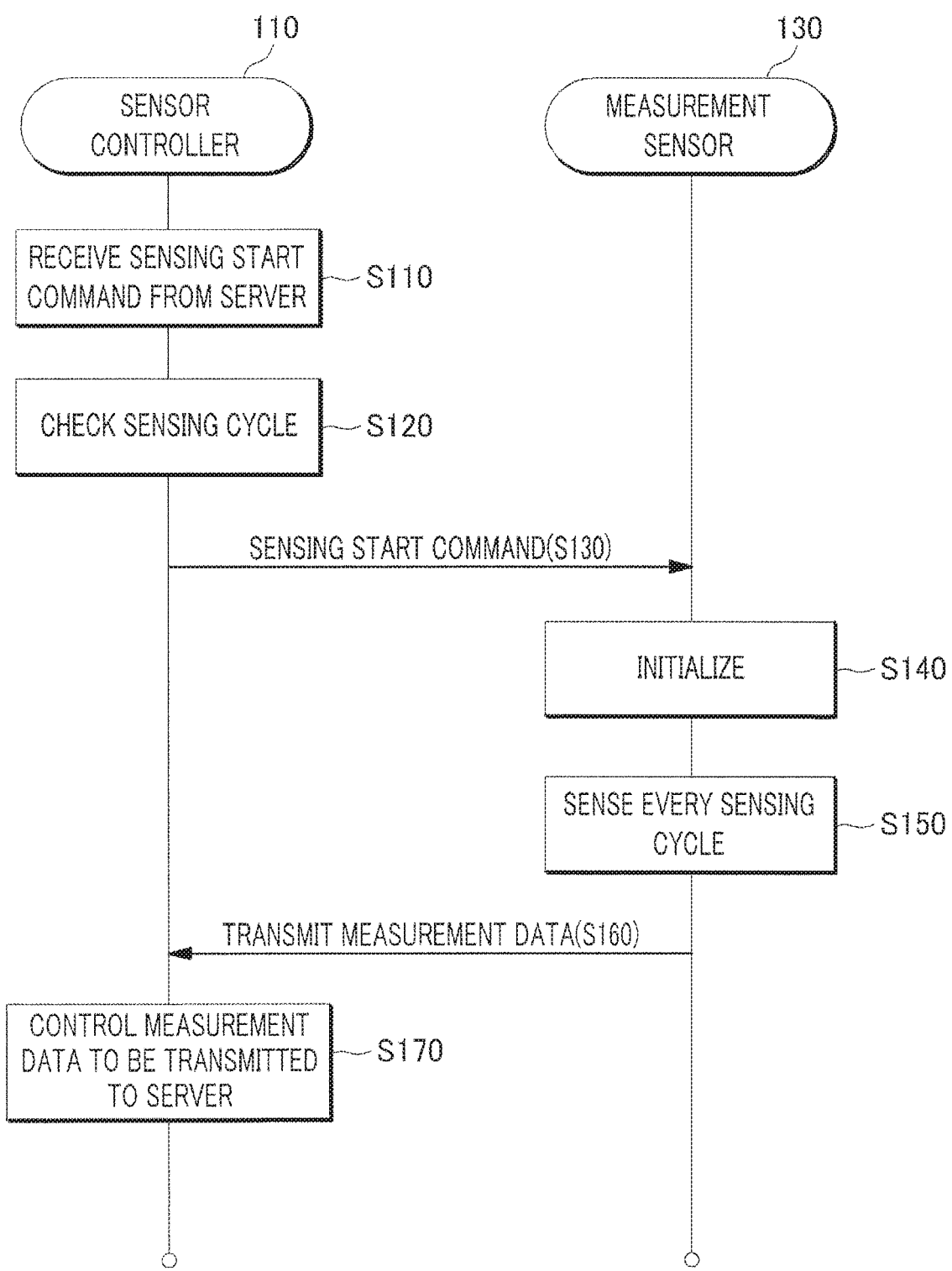
FIG. 5 is a flowchart provided to explain an exemplary embodiment where a sensor controller collects operation data of a machine by controlling a measurement sensor in accordance with an exemplary embodiment of the present disclosure.

Hereinafter, a process of collecting operation data of the machine 10 by the sensor controller 110 through the measurement sensor 130 will be described in detail with reference to FIG. 5.

The sensor controller 110 may receive a sensing start command from the server 200 (S110).

The sensor controller 110 may check a sensing cycle (S120). The sensor controller 110 may control the sensors to operate for a predetermined sensing cycle, or if the sensing cycle is changed, the sensor controller 110 may check the sensing cycle to apply the change. Herein, the sensing cycle refers to a period of time when the measurement sensor 130 senses operation data. If the measurement sensor 130 continuously senses operation data at all times, the measurement sensor 130 may be overloaded and may excessively consume electric power. Therefore, a specific period is set and operation data are sensed and collected only for the specific period.

The sensor controller 110 may transfer the sensing start command to the measurement sensor 130 (S130).

The measurement sensor 130 may receive the command and perform initialization (S140).

Further, the measurement sensor 130 may perform sensing every sensing cycle (e.g., 1 second) transferred by the sensor controller 110 (S150). The measurement sensor 130 may perform initialization and then store data about the sensing cycle.

The measurement sensor 130 may transfer operation data measured every sensing cycle to the sensor controller 110 (S160).

The sensor controller 110 may transfer the operation data to the communication mode 120 so as to be transmitted to the server 200 (S170). In this case, the sensor controller 110 may transfer operation data to the communication module 120 whenever the operation data are collected, or may accumulate operation data for a period of time longer than the sensing cycle and then transfer the operation data to the communication module 120, or may transfer operation data accumulated in the case where the sensor controller 110 receives a request for the accumulated data from the server 200.

Meanwhile, after the sensor controller 110 collects the operation data, the server 200 may determine a measurement value of each machine in two exemplary embodiments.

Hereinafter, the two exemplary embodiments will be described in detail with reference to FIG. 6 and FIG. 7.

Figure 6:
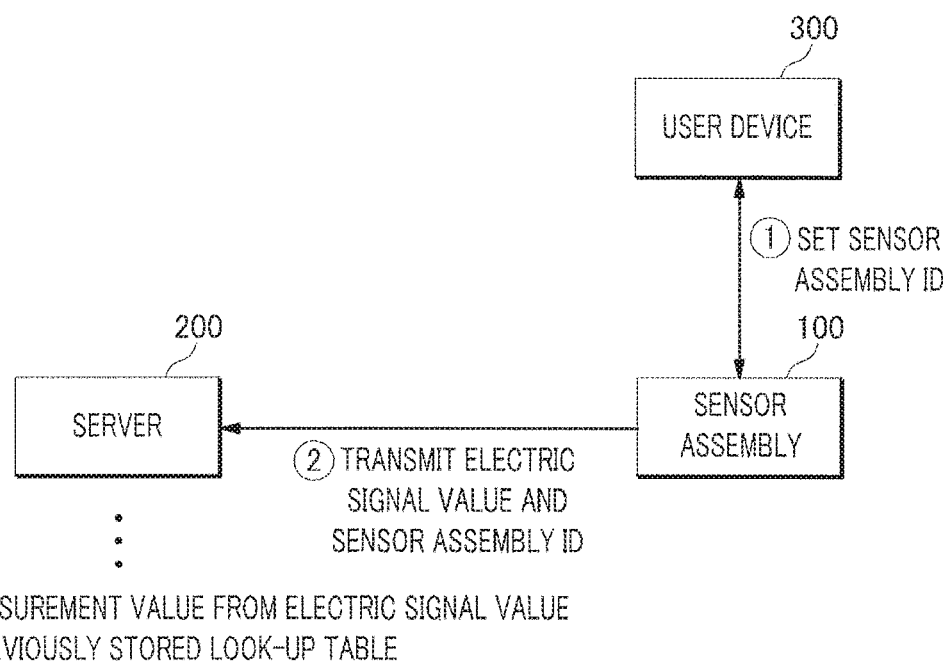
FIG. 6 and FIG. 7 are conceptual diagrams illustrating a process for detecting a measurement value from an electric signal value generated by a measurement sensor in accordance with an exemplary embodiment of the present disclosure.

FIG. 6 illustrates the case where the server 200 is a cloud server outside the factory. That is, factory management information is collected and managed by the cloud server outside the factory.

Firstly, the user device 300 and the sensor assembly 100 may have communication connection with each other through near-field communication (e.g., Bluetooth). Herein, information indicating that the sensor assembly 100 was recognized may be supplied on an application of the user device 300, and the user may set identification information (ID) of the sensor assembly 100. The ID of the sensor assembly 100 may include ID of the sensor controller 110 and ID of the measurement sensor 130. Then, if the measurement sensor 130 reads an electric signal value of the machine and transfer the electric signal value to the sensor controller 110, the sensor controller 110 may transmit the electric signal value and the ID of the sensor assembly 100 to the server 200. In the server 200, information indicative of the measurement sensors 130 arranged in the respective sensor assemblies 100 is previously stored. Further, in the server 200, information about the units (mA or A, mV or V, mΩ or Ω) of electric signal values measured by the measurement sensors 130 is previously stored. For example, the sensor controller 110 may transmit a value of 0.5 to the server 200, and in this case, the value does not include information about the unit. Therefore, the server 200 identifies the unit of an electric signal received with reference to the unit information of the measurement sensor 130 matched with the sensor assembly 100 and stored in the server 200. Then, the server 200 detects operation data (measurement values) from the electric signal with reference to a predetermined look-up table or calculation information (i.e., equation). For example, assuming 0.5 mA which is an electric signal value measured by the temperature sensor corresponds to 25° C., an equation for extracting 25° C. from 0.5 mA may be previously stored. The equation may be defined on the basis of information in the look-up table. Further, the server 200 may match and store a measurement value as information about a specific machine in the factory of the user with reference to the ID of the sensor assembly 100.

Since the firmware is installed in the server 200, the sensor controller 110 does not need to continuously update the firmware. If the sensor controller 110 needs to update the firmware, the measurement sensor 130 and the sensor controller 110 need to be continuously connected to each other and the update may be interrupted by replacement of a worker or the like. However, in the present disclosure, there is no possibility of that. Further, the sensor controller 110 is not likely to reach a capacity limit when the firmware is updated, and the worker does not need to perform a manual operation for firmware update. In all of conventional measurement sensors, firmware is installed on the sensor side. This is because the initial sensors were developed to directly show operation data (e.g., temperature value) to the user. However, in the present disclosure, the firmware is installed in the server 200, and, thus, it is possible to solve problems of inconvenience caused by firmware management.

Figure 7:
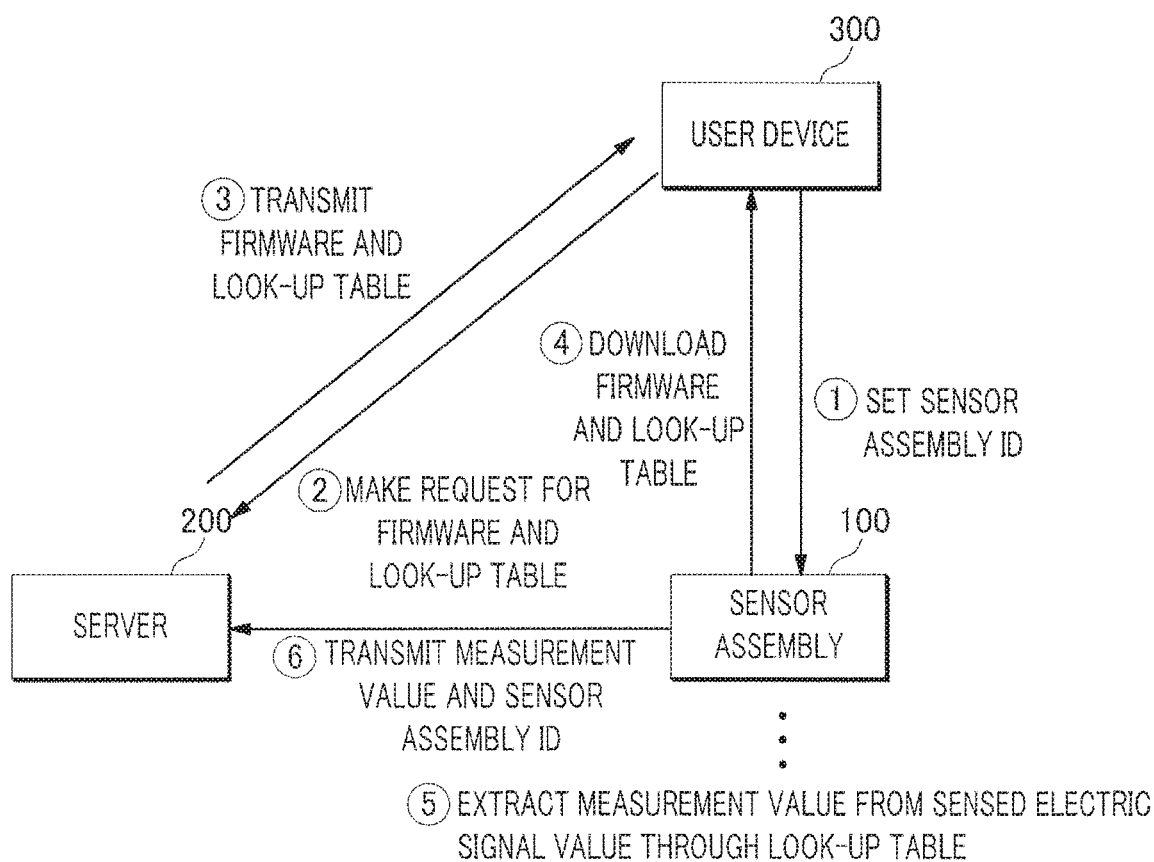

FIG. 7 illustrates the case where the server 200 is not a cloud server but a server using a network in the factory. Desirably, the exemplary embodiment illustrated in FIG. 7 is implemented in the case where a cloud network environment is not supported, but is not necessarily limited thereto.

Firstly, the sensor assembly 100 may be assigned ID of the sensor assembly 100 by the user device 300 in the same manner as the process ① in FIG. 6. Then, the user device 300 may transmit the ID of the sensor assembly 100 to the server 200 to make a request for firmware and a look-up table (or calculation information (i.e., equation)) suitable for the sensor assembly 100 and then receive the firmware and the look-up table. Then, the firmware and the look-up table are downloaded from the user device 300 and then installed in the sensor controller 110 of the sensor assembly 100. Accordingly, if an A/D signal value is received from the measurement sensor 130, the sensor controller 110 may recognize the A/D signal value through the firmware and extract a measurement value from the A/D signal value through the look-up table (or calculation information). Then, the sensor assembly 100 may transmit the extracted measurement value to the server 200. The sensor controller 110 may download all firmware for all the multiple measurement sensors 130 and recognize all of A/D signal values. Meanwhile, the measurement values stored in the server 200 may be transmitted again to the cloud server in the case where the cloud network environment is supported later.

If the firmware and the look-up table (or calculation information) are stored not in the sensor assembly 100 but in the server 200 as shown in FIG. 6, it is possible to minimize the process of developing firmware and installing the firmware in the sensor assembly 100. If the firmware and the look-up table (or calculation information) are installed in the sensor controller 110, the capacity and function of the MCU and ROM of the sensor controller 110 may be highly affected. In this case, development costs are considerably high. However, a processing operation can be minimized by the method as shown in FIG. 6, costs for manufacturing the MCU and ROM of the sensor controller 110 or effort required for management can be reduced. Further, the sensor controller 110 can only function to transfer an A/D signal. Therefore, the sensor controller 110 can be connected to various measurement sensors 130 and thus may have wide compatibility.

The exemplary embodiment illustrated in FIG. 7 is applied to the case where the cloud network environment as shown in FIG. 6 is not supported. In the exemplary embodiment illustrated in FIG. 7, the single sensor controller 110 downloads the firmware and look-up table for the multiple measurement sensors 130 and can recognize A/D signal values of the multiple measurement sensors 130 and thus may have wide compatibility.

Meanwhile, if the firmware needs to be installed in the sensor controller 110 as shown in FIG. 7, when the firmware is installed or updated, the sensor controller 110 may automatically download the firmware in association with the server.

Hereinafter, an automatic firmware update process according to the exemplary embodiment illustrated in FIG. 7 will be described in detail.

The factory manager may approach a specific machine while directly checking the interior or exterior of machines or touring the inside of the factory.

In this case, the user device 300 held by the factory manager may recognize that the sensor assembly 100 is adjacent thereto, and if the user device 300 senses the sensor assembly 100 within a predetermined approach distance, the user device 300 may be connected to the sensor assembly 100 through wireless communication. For example, the user device 300 may be connected to the sensor assembly 100 through various communication means such as Bluetooth, WiFi, or Zigbee, or the like.

Then, the sensor controller 110 of the sensor assembly 100 may transmit at least one of ID of the sensor controller 110, ID of the measurement sensor 130, and operation data of the measurement sensor 130 collected by the sensor controller 110 and firmware information for each measurement sensor 130 installed in the sensor controller 110 to the user device 300. The firmware information may include version information of the firmware, ID of the firmware, and information about the measurement sensor 130 relevant to the firmware.

The user device 300 may ask a question about whether firmware update is needed while transmitting the firmware information to the server 200.

The server 200 may store firmware information for each measurement sensor 130, and when the firmware information is updated, the server 200 stores the updated file.

The server 200 may compare the firmware version information received from the user device 300 with firmware version information currently stored in the server 200, and if the firmware version information received from the user device 300 has a lower level, the server 200 may determine that the firmware in the sensor controller 110 needs to be updated.

Then, the server 200 may transmit information indicating that update is needed to the user device 300. In this case, update may be automatically performed with the approval of the factory manager or may be immediately performed without the approval.

When the update is performed, the server 200 may transmit the firmware update file and the ID of the sensor controller 110 and the measurement sensor 130 to the user device 300. The user device 300 may identify the sensor controller 110 to be updated with reference to the ID of the sensor controller 110 and the measurement sensor 130 and transmit the firmware update file to the identified sensor controller 110 so as to be installed therein.

In an additional exemplary embodiment, the update may be performed through the following process.

The server 200 may transmit header data of firmware to be updated to the user device 300. The header data refer to a 0th block among block data constituting the firmware.

The sensor controller 110 or the user device 300 may read the total number of blocks of the firmware on the basis of the header data (S250). Hereinafter, it will be assumed that the total number of blocks is n (n is a natural number more than 1).

Then, the server 200 may transmit 1st block data of the firmware to the user device 300, and the user device 300 may transfer the 1st block data to the sensor controller 110.

The sensor controller 110 or the user device 300 may perform CRC validation to the 1st block data. The CRC (Cyclical Redundancy Check) validation is also referred to as cyclic redundancy verification. Specifically, if the remainder obtained by dividing transmission target data by a predetermined check value as a divisor is transmitted as being attached to the end of the transmission target data from a transmitting end, the remainder obtained by dividing data received by a receiving end by the check value may be compared or it may be determined whether the remainder obtained by dividing the whole data transmitted with the remainder attached thereto is 0 to determine whether there is a data error.

If an error is detected, the sensor controller 110 may transmit a command indicating that the user device 300 is requested to make a re-request for error block data to the server 200, to the user device 300. If the block data cannot be received despite the re-request or an error occurs again, the command may be transmitted again. If the number of times of making a re-request is higher than a predetermined number of times, the sensor controller 110 or the user device 300 may transmit an error message to the server 200.

If an error is not detected, the sensor controller 110 may copy and paste the received block data to the position of a firmware block for the corresponding measurement sensor 130 previously stored in a memory of the sensor controller 110.

Then, the sensor controller 110 may check whether the copied block data are the last ones.

If the copied block data are not the last ones, the sensor controller 110 may perform a process of receiving other block data. In this manner, the sensor controller 110 may repeatedly perform the process with respect to from the 1st block data to nth block data.

Finally, when the sensor controller 110 receives all of the block data from the server 200, the sensor controller 110 may transmit a firmware download complete acknowledgement (ACK) to the user device 300.

The firmware is automatically updated in the sensor assembly 100 through the above-described process. Thus, the factory manager does not need to perform firmware update for each measurement sensor 130 or to manually store an install file of the server 200 in a USB and install the install file in the measurement sensor 130 for update.

Meanwhile, the sensor controller 110 may include a memory in which a program (or application) configured to perform the above-described operation is stored and a processor (e.g., micro controller unit (MCU)) configured to run the program.

Meanwhile, only some components, e.g., the communication module 120, of the multiple sensor assemblies 100 may have a base station-based wireless communication function such as 3G or 4G and the other components may have a near field wireless communication function such as WiFi. In this case, communication costs for using the communication network can be reduced, and it is only necessary to collect the whole data in one area and then transmit the whole data to the server 200, and, thus, the smart factory service can be used without any big problems.

The embodiment of the present disclosure can be embodied in a storage medium including instruction codes executable by a computer such as a program module run by the computer. Besides, the data structure in accordance with the embodiment of the present disclosure can be stored in the storage medium executable by the computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data.

The method and system of the present disclosure has been explained in relation to a specific embodiment, but its components or a part or all of its operations can be embodied by using a computer system having general-purpose hardware architecture.

The above description of the present disclosure is provided for the purpose of illustration, and it would be understood by those skilled in the field that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A system comprising:
a plurality of measurement sensors connected to a machine and configured to detect operation data of the machine;
a sensor controller configured to:
receive a current value, a voltage value or a resistance value, from each of the plurality of measurement sensor;
convert the current value, the voltage value, or the resistance value into a normalized digital signal;
transfer the normalized digital signal and identification information of each of the plurality of measurement sensors and the sensor controller to a communication module to be wirelessly transmitted to a server, wherein even if the sensor controller is connected to a measurement sensor different in kind from the plurality of measurement sensors via replacement or addition of a measurement sensor, the sensor controller provides a normalized digital signal of the current value, the voltage value, or the resistance value of the measurement sensor connected to the sensor controller with the server through the communication module, and
the server configured to:
store information about a unit for a normalized digital signal for each of the plurality of measurement sensors, the information about the unit including one of a unit of electric current, a unit of voltage and a unit of resistance;
store firmware for the plurality of measurement sensors and an equation for converting a normalized digital signal of each of the plurality of measurement sensors along with information about a unit for the normalized digital signal to a measurement value;
identify information about a unit of the normalized digital signal of each of the plurality of measurement sensors based on identification information of the measurement sensor; and
convert the normalized digital signal along with the identified information about the unit of the normalized digital signal to a measurement value, which is a temperature, humidity, pressure, or electric power for an operation of the machine on the basis of the firmware for the measurement sensor, the equation, and the identification information of the measurement sensor and the sensor controller, and
wherein the sensor controller is configured to:
determine whether a predetermined sensing cycle is changed; and
in response to determination that the predetermined sensing cycle is changed, transmit the changed sensing cycle to the plurality of measurement sensors.

2. The system of claim 1,
wherein the sensor controller is connected to multiple measurement sensors different from each other and configured to collect different kinds of operation data of the machine.

3. The system of claim 1,
wherein the sensor controller receives operation data from the plurality of measurement sensors every predetermined sensing cycle.

4. The system of claim 1,
wherein the server is a cloud server outside a factory in which the machine is installed.

5. The system of claim 1,
wherein the sensor controller is configured to communicate with a previously specified server in a factory, and receives firmware and the information which defines the equation from a user device that communicates with a cloud server outside the factory.

6. The system of claim 5,
wherein if the user device is located within a specific proximity radius from the sensor controller, the sensor controller is connected to the user device through wireless communication, and
the firmware for each measurement sensor and the information which defines the equation and is stored in the server are transferred from the user device to the sensor controller and installed in the sensor controller.

7. The system of claim 6,
wherein if the sensor controller is connected to the user device through wireless communication, the sensor controller transmits firmware version information to the user device, and
if the firmware version information is not identical to the latest firmware version, the sensor controller receives a firmware update file corresponding to the latest firmware version from the user device.

8. The system of claim 7,
wherein the sensor controller receives header data of firmware to be updated and reads the total number of blocks and then makes a request for each block data to the user device, and
the sensor controller sequentially performs a process of receiving block data, validating the received block data, making a re-request for block data if an error is found, and storing the received block data with respect to from first block data to last block data to perform firmware update.

* * * * *